United States Patent [19]
Mertens

[11] Patent Number: 6,092,383
[45] Date of Patent: Jul. 25, 2000

[54] MOTOR VEHICLE AIR CONDITIONING DEVICE WITH COMPACT REFRIGERATING LOOP

[75] Inventor: Klaus Mertens, Elancourt, France

[73] Assignee: Valeo Thermique Moteur, La Verriere, France

[21] Appl. No.: 09/269,091

[22] PCT Filed: Jul. 13, 1998

[86] PCT No.: PCT/FR98/01532

§ 371 Date: Mar. 18, 1999

§ 102(e) Date: Mar. 18, 1999

[87] PCT Pub. No.: WO99/03692

PCT Pub. Date: Jan. 28, 1999

[30] Foreign Application Priority Data

Jul. 18, 1997 [FR] France ................................. 97 09169

[51] Int. Cl.[7] .................................................. F25B 27/02
[52] U.S. Cl. ........................... 62/238.6; 62/323.1; 165/43
[58] Field of Search ............................... 62/238.6, 323.1, 62/238.7, 239; 165/42, 43

[56] References Cited

U.S. PATENT DOCUMENTS

| 3,990,505 | 11/1976 | Davenport .................................. 165/43 |
| 4,735,061 | 4/1988 | Hsieh ...................................... 62/238.6 |
| 4,754,614 | 7/1988 | Yuyama .................................. 62/238.6 |
| 5,243,825 | 9/1993 | Lin ........................................ 62/323.1 |
| 5,363,673 | 11/1994 | Atterbury et al. ...................... 62/323.1 |
| 5,584,185 | 12/1996 | Rumble et al. ........................ 62/323.1 |
| 5,641,016 | 6/1997 | Isaji et al. .............................. 62/238.6 |

FOREIGN PATENT DOCUMENTS

| 256 305 | 2/1988 | European Pat. Off. . |
| 38 03 439 | 8/1989 | Germany . |
| 41 24 888 | 1/1993 | Germany . |

OTHER PUBLICATIONS

International Search Report dated Nov. 25, 1998.

*Primary Examiner*—William E. Tapolcai
*Attorney, Agent, or Firm*—Morgan & Finnegan LLP

[57] ABSTRACT

The cooling fluid from the internal combustion engine of the vehicle flows through the condenser and the evaporator, rather than air flows, and the fluid cooled in this way by the evaporator is sent to the radiator for heating the passenger compartment, if necessary, which is then the only heat exchanger in contact with the flow of air to be sent into the passenger compartment. The components of the refrigerant fluid loop can therefore be grouped together, which avoids long pipes in the engine compartment which are costly and entail the risk of leaks.

12 Claims, 2 Drawing Sheets

MOTOR VEHICLE AIR CONDITIONING DEVICE WITH COMPACT REFRIGERATING LOOP

BACKGROUND OF THE INVENTION

The invention concerns a device for cooling the engine of a motor vehicle and for air conditioning the passenger compartment of the vehicle, comprising a) a heat-conveying fluid first circuit including a radiator for cooling the engine and a heat exchanger through which flows air to be directed into the passenger compartment, and b) a refrigerant fluid second circuit including a compressor, a condenser, an expansion unit and an evaporator, the condenser and the evaporator being adapted to transfer heat from a first medium in contact with the evaporator to a second medium in contact with the condenser via the refrigerant fluid to cool said flow of air.

In a device of the above kind the first medium and the second medium are conventionally the external atmosphere and said flow of air, respectively. The condenser is generally at the front end of the vehicle so as to receive directly the flow of atmospheric air caused by the movement of the vehicle. The evaporator is disposed in the passenger compartment, within an air conditioning unit, so that the flow of air to be directed into the passenger compartment flows through it in series or in parallel with the heat exchanger.

The compressor is usually driven by the engine of the vehicle and consequently is located near the engine.

The components of the refrigerant fluid circuit are therefore dispersed, which necessitates long connecting pipes in the engine compartment of the vehicle, which are costly and introduce the risk of leaks. The pipes must be removed to enable work to be carried out in the engine compartment, and this necessitates refilling of the circuit.

The aim of the invention is to remedy the above drawbacks.

BRIEF DESCRIPTION OF THE INVENTION

The invention is directed in particular to a device of the kind defined in the introduction and provides for said first and second media to comprise the heat-conveying fluid flowing in the first circuit, the latter including supply means for supplying said heat exchanger with hot fluid from the engine and/or fluid cooled by the evaporator, to regulate the temperature of said flow of air.

Because the respective flows of air defined above no longer have to pass through the condenser and the evaporator, the latter can be disposed as required, and in particular very close to each other and very close to the compressor, which eliminates the connecting pipes or reduces their length.

Complementary or alternative optional features of the invention are as follows:

The supply means enable progressive adjustment of the flowrates of the hot and cooled fluids.

The supply means comprise a valve connected to the engine, to the evaporator and to the heat exchanger.

The condenser receives a fraction of the flow of fluid leaving the cooling radiator.

The evaporator receives a fraction of the flow of fluid leaving the heat exchanger, which fraction can vary in the range 0% to 100%.

The complementary fractions of the flows of fluid leaving the cooling radiator and the heat exchanger are sent to the engine.

Of the fractions leaving the cooling radiator, the fraction sent to the evaporator is cooled more than the fraction sent to the engine.

The heat-conveying fluid leaving the condenser is sent to the engine.

The components of the second circuit are in the immediate vicinity of each other.

The components of the second circuit are in the immediate vicinity of the engine.

At least the condenser and the evaporator are combined in the form of a module.

A refrigerant fluid reservoir is integrated into the condenser.

BRIEF DESCRIPTION OF THE DRAWINGS

The features and advantages of the invention will be explained in more detail in the following description with reference to the accompanying drawings, in which.

DETAILED DESCRIPTION OF DRAWINGS

Figure 1:
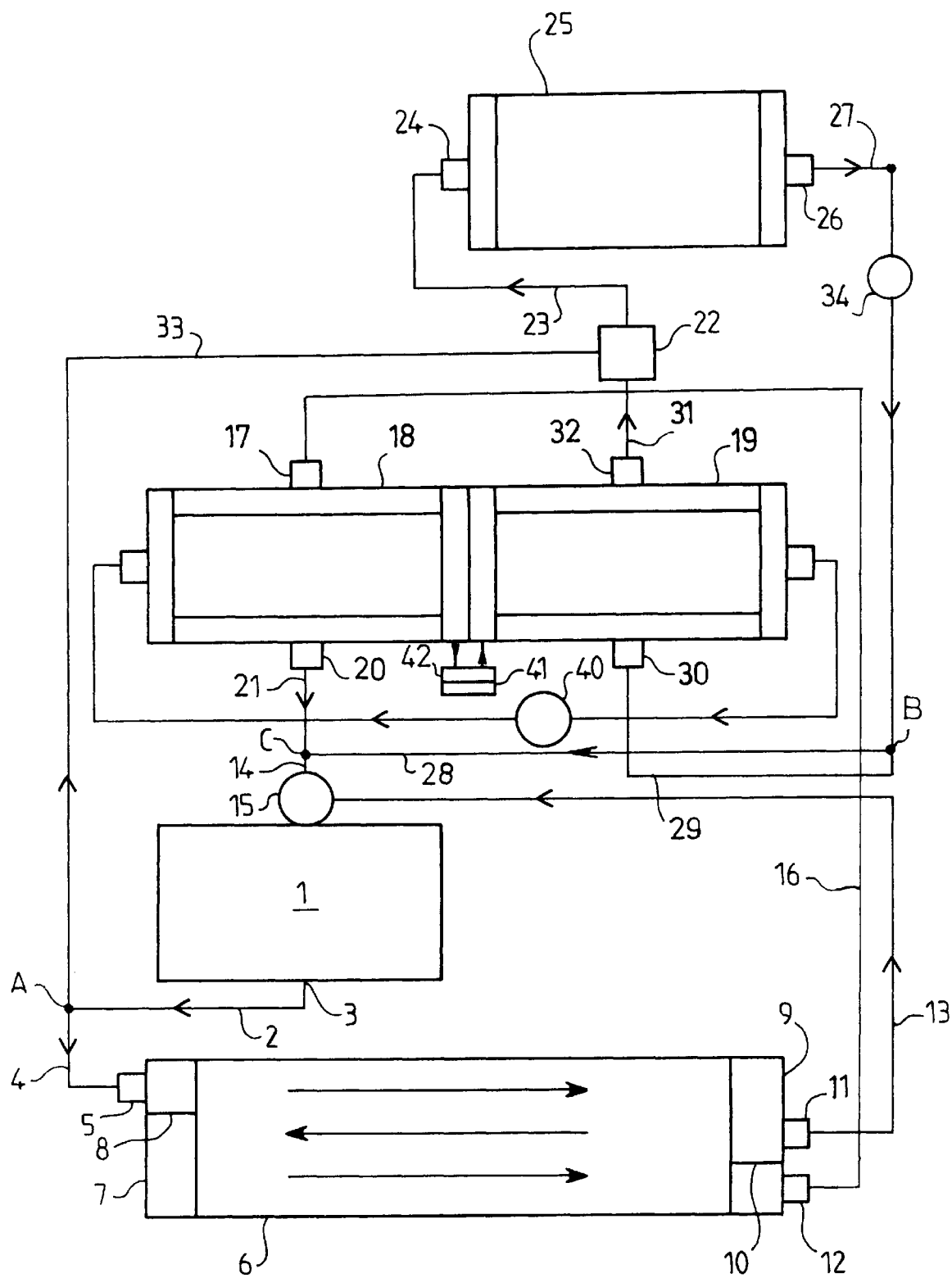
FIG. 1 is a schematic diagram of a device in accordance with the invention.

The device shown in FIG. 1 comprises a circuit in which flows a heat-conveying fluid such as an aqueous solution of ethylene glycol used in particular to cool the internal combustion engine 1 that drives the motor vehicle on which the device is mounted. One branch 2 of the circuit conveys the heat-conveying fluid from the outlet 3 from the engine to a connecting point A. A pipe 4 leads from the point A to the inlet connector 5 of a cooling radiator 6, that inlet connector being on a fluid box 7 divided into two compartments by a partition 8. Another fluid box 9 of the radiator 6 is divided by a partition 10 into two compartments that respectively communicate with outlet connectors 11 and 12. Thus the fluid 2 can leave the radiator either via the connector 11 after a single pass or via the connector 12 after three passes. A pipe 13 leads from the connector 11 to a circulating pump 15 at the inlet of the engine 1.

The second outlet connector 12 of the radiator 6 is connected via a pipe 16 to the heat-conveying fluid inlet connector 17 of a condenser 18 that is also part of a refrigerant fluid circuit to be described later, the condenser 18 and an evaporator 19 being adapted to exchange heat between the heat-conveying fluid and the refrigerant fluid. The heat-conveying fluid outlet connector 20 of the condenser 18 is connected by a pipe 21 to a connection point C communicating via a pipe 14 with the inlet of the pump 15.

The single outlet of a three-way valve 22 communicates via a pipe 23 with the inlet connector 24 of a heat exchanger 25 through which flows air to be directed into the passenger compartment of the vehicle. The outlet connector 26 of the heat exchanger 25 is connected by a pipe 27 to a connecting point B in turn connected to the point C by a pipe 28. The point B is also connected by a pipe 29 to the heat-conveying fluid inlet 30 of the evaporator 19. Finally, a pipe 31 and a pipe 33 respectively connect the outlet connector 32 of the evaporator 19 and the point A to the two inlets of the valve 22.

The previously mentioned refrigerant fluid circuit comprises, in addition to the condenser 18 and the evaporator 19, a compressor 40 which aspirates the refrigerant fluid from the evaporator in order to direct it into the condenser and an expansion unit 41 and a replaceable filter and dessicator cartridge 42 between the condenser and the evaporator. The condenser 19 has a desuperheater and condenser section and an undercooling section connected to each other by a refrigerant fluid reservoir, not shown.

The refrigerant fluid circuit operates in the usual manner in a vehicle air conditioning device, except that the evaporator 19 and the condenser 18 take heat from and give up heat to the heat-conveying fluid cooling the engine 1, rather than flows of air.

The valve 22 is controlled by means, not shown, in particular in accordance with heating or cooling needs of the passenger compartment of the vehicle so that the inlet connector 24 of the heat exchanger 25 is fed either with hot fluid from the engine 1 via the pipes 2 and 33 or with fluid cooled by the evaporator 19 and transmitted through the pipe 31, or a mixture of the two fluids, in proportions that can vary continuously. The heat exchanger 25 can therefore heat or cool a flow of air passing through it to be directed into the passenger compartment. A portion of the heat-conveying fluid that has flowed through the exchanger, corresponding to the flowrate in the pipe 21, is sampled in order to be returned to the evaporator 19 via the pipe 29. The fluid leaving the condenser via the pipe 21 and the complementary portion of the fluid leaving the exchanger 25 via the pipe 28 are aspirated by the pump 15 and returned to the engine 1 conjointly with the fluid leaving the radiator via the connector 11. An electric pump 34 on the pipe 27 causes the fluid to flow in a closed circuit in the heat exchanger 25 and in the evaporator 19, if required.

What is more, any fluid reaching the valve 22 via the pipe 33 is merely a fraction of the fluid leaving the engine 1, the remainder being sent via the pipe 4 to the inlet connector 5 of the cooling radiator 6. This remainder is in turn divided by the radiator 6 into a portion that leaves via the connector 11 and is returned to the pump 15 via the pipe 13 and a fraction that leaves via the pipe 12 and is sent to the condenser 18 via the pipe 16.

For example, the radiator 6 can be designed to cool the fluid from 90° C. at the exit from the engine to 80° C. in the outlet connector 11, to assure an optimum operating temperature of the engine 1, and to a temperature 15° higher than ambient temperature in the outlet connector 12, to assure efficient cooling of the condenser.

FIG. 2 shows again the essential components described with reference to FIG. 1. The radiator 6 is at the front end of the vehicle, the direction of motion of which is indicated by the arrow F1. The engine 1 is housed in the engine compartment to the rear of the radiator 6 and the heat exchanger 25 is in an air conditioning unit, not shown, inside the passenger compartment and consequently to the rear of the engine 1. The arrows F2 and F3 respectively indicate the flows of air through the exchangers 6 and 25.

Figure 2:
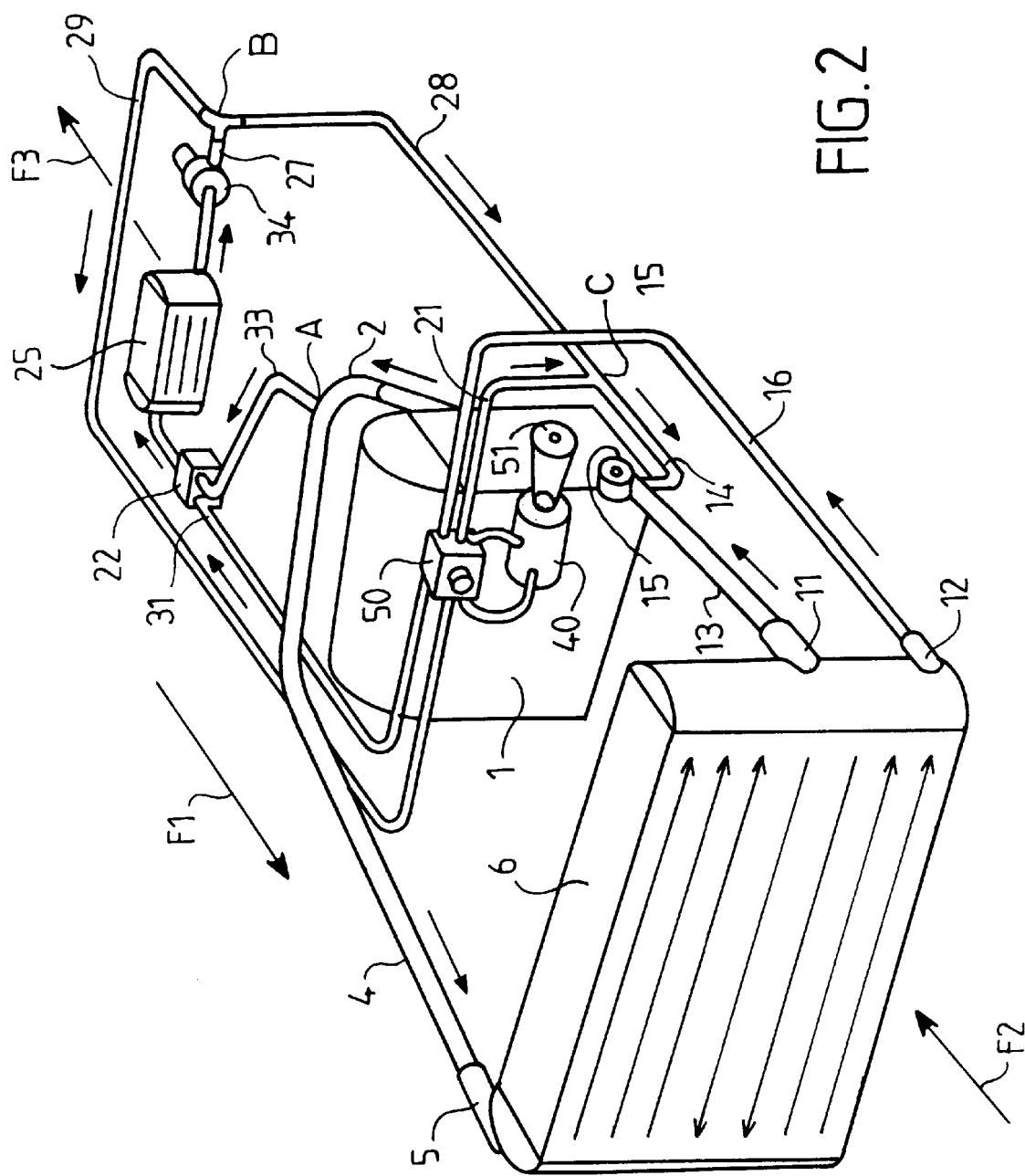
FIG. 2 is a diagrammatic perspective view of the device.

The condenser 18, the evaporator 19, the expansion unit 41 and the cartridge 42, which are not shown individually in FIG. 2, are in the form of a module 50 fixed to the engine 1 in the immediate vicinity of the compressor 40, which is also fixed to the engine and driven by means of a pulley 51 on the drive shaft.

The condenser 18 and the evaporator 19 advantageously employ the "plate" or "blade" technology, that is to say they are in the form of a stack of pockets, each pocket comprising two cup-shape pressed sheet metal members the concave sides of which face towards each other and which are fixed and sealed together edge-to-edge.

Changes can be made to the device described without departing from the scope of the invention. Thus the valve 22 can be at point B instead of at the point of connection of the pipes 23, 31 and 33. Similarly, the pump 34 can be on the pipe 23. The valve and/or the pump can be integrated into the module 50. The single radiator 6 can be replaced by two separate radiators through which the fluid in the pipe 16 flows in series and through only the first of which the fluid in the pipe 13 flows.

What is claimed is:

1. A device for cooling the engine of a motor vehicle and for air conditioning the passenger compartment of the vehicle, including a) a heat-conveying fluid first circuit including a radiator for cooling the engine and a heat exchanger through which flows air to be directed into the passenger compartment, and b) a refrigerant fluid second circuit including a compressor, a condenser, an expansion unit and an evaporator, the condenser and the evaporator being capable of tranferring heat from a first medium in contact with the evaporator to a second medium in contact with the condenser via the refrigerant fluid to cool said flow of air, wherein said first and second media are the heat-conveying fluid flowing in the first circuit, the first circuit including a supply member capable of being selectively in communication between the heat exchanger and either the engine or the evaporator for supplying said heat exchanger with a flow of hot fluid from the engine or a flow of fluid cooled by the evaporator or a mixture of hot fluid and cold fluid, to regulate the temperature of said flow of air.

2. A device according to claim 1 wherein the supply member is configured to provide progressive adjustment of the flows of the hot and cooled fluids.

3. A device according to claim 1 wherein the supply member comprises a valve communicating with the engine, the evaporator and the heat exchanger.

4. A device according to claim 1 which further comprises a conduit for providing the condenser with a fraction of the flow of fluid leaving the cooling radiator.

5. A device according to claim 1 which further comprises a conduit for providing the evaporator with a fraction of the flow of fluid leaving the heat exchanger.

6. A device according to claim 5 wherein complementary fractions of flows of fluid leaving the cooling radiator and the heat exchanger are sent to the engine.

7. A device according to claim 6 wherein the fraction of fluid leaving the cooling radiator and sent to the condenser is cooled more than the fraction of fluid leaving the radiator and sent to the engine.

8. A device according to claim 1 which further comprises a conduit for directing heat-conveying fluid from the condenser to the engine.

9. A device according to claim 1 wherein the components of the second circuit are in the immediate vicinity of each other.

10. A device according to claim 9 wherein the compressor, condensor, expansion unit and evaporator are disposed adjacent to the engine.

11. A device according to claim 1 wherein at least the condenser and the evaporator comprise an integral module.

12. A device according to claim 1 wherein a refrigerant fluid reservoir is disposed in the condenser.

* * * * *